United States Patent
Segal

(10) Patent No.: US 7,552,462 B2
(45) Date of Patent: Jun. 23, 2009

(54) METHOD AND APPARATUS FOR ASSIGNING COMMUNICATION NODES TO CMTS CARDS

(75) Inventor: Moshe Segal, Tinton Falls, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 12/072,372

(22) Filed: Feb. 26, 2008

(65) Prior Publication Data
US 2008/0159745 A1    Jul. 3, 2008

Related U.S. Application Data

(63) Continuation of application No. 10/144,409, filed on May 10, 2002, now Pat. No. 7,353,530.

(51) Int. Cl.
*H04N 7/16* (2006.01)
*H04L 12/28* (2006.01)

(52) U.S. Cl. ............... 725/119; 725/111; 370/254; 370/255

(58) Field of Classification Search ............... 725/129, 725/119, 107, 127, 111; 370/468, 255, 437, 370/254
See application file for complete search history.

(56) References Cited

U.S. PATENT DOCUMENTS

| | | | | |
|---|---|---|---|---|
| 6,137,793 A | * | 10/2000 | Gorman et al. | 370/360 |
| 6,333,979 B1 | * | 12/2001 | Bondi et al. | 379/219 |
| 6,404,744 B1 | * | 6/2002 | Saito | 370/255 |
| 6,952,729 B2 | * | 10/2005 | Bialk et al. | 709/224 |

* cited by examiner

*Primary Examiner*—Christopher Kelley
*Assistant Examiner*—Timothy R Newlin
(74) *Attorney, Agent, or Firm*—Hoffmann & Baron, LLP

(57) ABSTRACT

A method and apparatus for assigning nodes to CMTS cards in a communication system. In order to avoid bottlenecks and to efficiently use resources of the cards in a hybrid fiber-coax architecture, the nodes are assigned to the cards using linear programming techniques so as to distribute the traffic load and minimize the unused capacity of each card. The number of households, nodes and cards are determined and used to establish a model which is then implemented using linear programming techniques to determine an optimal solution.

19 Claims, 4 Drawing Sheets

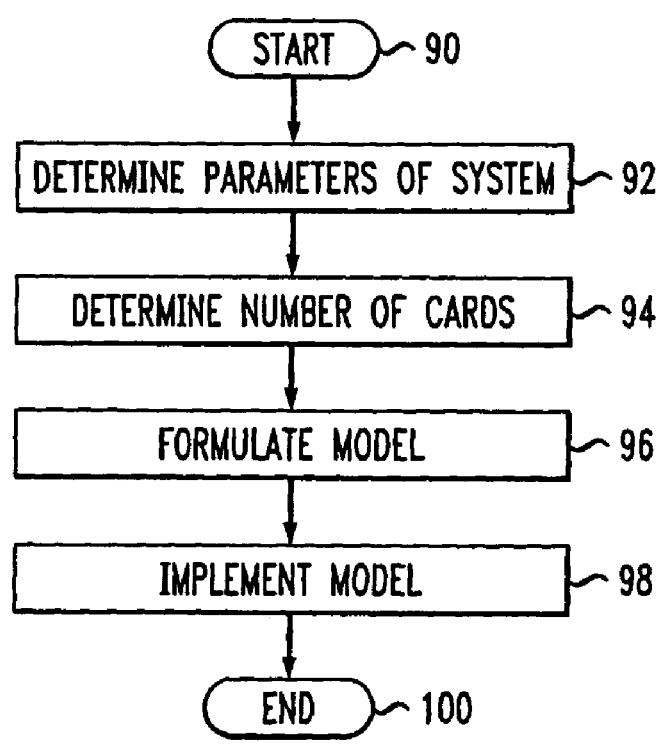

US 7,552,462 B2

METHOD AND APPARATUS FOR ASSIGNING COMMUNICATION NODES TO CMTS CARDS

CROSS-REFERENCE TO RELATED APPLICATIONS

This application is a continuation of U.S. application Ser. No. 10/144,409, filed May 10, 2002, now U.S. Pat. No. 7,353,530 which is incorporated herein by reference.

BACKGROUND OF THE INVENTION

1. Field of the Invention

The present invention relates generally to the assignment of nodes to CMTS cards and more particularly to a method and apparatus for assigning nodes to CMTS cards in an IP network using linear, integer and binary programming techniques.

2. Description of the Related Art

Telephone systems have traditionally used dedicated wiring strictly for telephony in homes and other locations. However, the information age has caused a large increase in the amount of information that is being sent and received to households. Also, additional phone lines are often desired in the household for voice, FAX and data (computers). In addition, many different types of signals, such as video, are sought to be available at home. In order to handle the various kinds of telephony, data signals and video signals that are now needed in a household and to more effectively carry these signals, different arrangements of wiring are being employed.

Thus, in order to provide a broadband system, an architecture is envisioned using a hybrid of fiber optic cables and coaxial cables to service households. In a typical arrangement, a broadband telephony interface (BTI) box is installed in the home of a subscriber. This interface would provide video signals, data signals and multiple phone lines for use in the household. This box would be connected to a coaxial cable carried by traditional utility poles or underground systems. Several of these cables would converge to a node that connects the cables to optical fibers. These fibers from the various nodes are then connected to a cable modem termination system (CMTS) card. Such a system has the ability to serve effectively the needs of thousands of households. However, it is important to maximize the traffic-carrying capability of the system. One particular problem is the effective use of the CMTS cards which are very expensive and which should be utilized to the best advantage. It is especially necessary to properly assign nodes to the various cards to maximize the service.

The problem of allocating distribution networks using linear, integer and binary programming methods has been studied with regard to communication problems. For example, U.S. Pat. No. 6,333,979 shows a method and apparatus for assigning incoming calls to communications processing centers. In this system, each center's free capacity is calculated and calls are allocated using linear programming methods so that the smallest amount of free capacity is maximized in order to determine the optimal call allocation scheme.

SUMMARY OF THE INVENTION

Accordingly, one object of the present invention is to provide a method and apparatus for maximizing the use of CMTS cards in a communication system.

Another object of this invention is to provide a method and apparatus for assigning nodes to a CMTS card in a communication system to allow for growth by distributing the free capacity among CMTS cards.

A further object of this invention is to provide a communication system using hybrid fiber-coax access architecture having a plurality of nodes connected to CMTS cards in an effective fashion.

A still further object of this invention is to provide a model of a communication system architecture including nodes and CMTS cards which can be maximized using linear, integer and binary programming techniques.

Another object of this invention is to provide a new and effective architecture for a communication system utilizing voice-over-IP arrangements including a plurality of nodes connected to CMTS cards in an efficient manner.

A still further object of this invention is to provide homes with broadband telephony interface boxes connected to coaxial cables which converge to nodes connected by optical fibers to CMTS cards in an efficient manner.

A still further object of this invention is to use linear, integer and binary programming techniques to solve a model of a hybrid fiber-coax access architecture providing broadband service in a communication system.

Briefly, these and other objects of the invention are achieved by establishing a model of the architecture of the communication system involving constraints for the various nodes which can be solved using linear programming techniques to maximize the connections of the nodes to the cards.

BRIEF DESCRIPTION OF THE DRAWINGS

The invention will be described with reference to the following figures in which like reference numerals refer to like elements, and wherein

FIG. 7 is a flowchart showing the operation of the present invention.

DETAILED DESCRIPTION OF THE PREFERRED EMBODIMENTS

Broadband service is provided to households in order to allow a single connection which carries not only video services, but also data and telephone services. The system for utilizing this is referred to as voice-over-IP (Internet Protocol) and utilizes an architecture of a hybrid fiber-coax. That is, the architecture utilizes coaxial cable for part of the connections and fiber optics for other parts. The system allows bi-directional telephone and data connections as well as the possibility of receiving video service.

Figure 1:
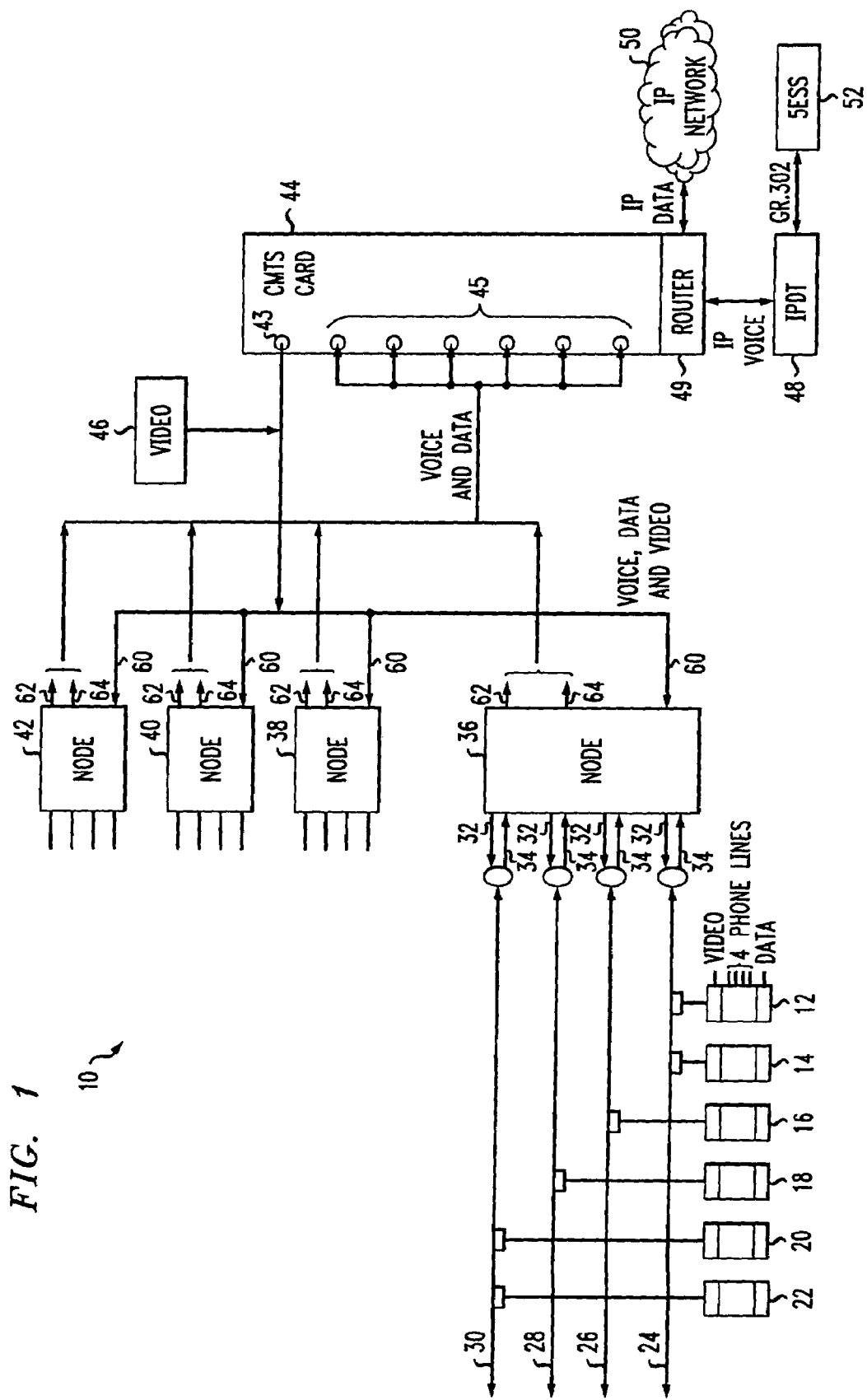
FIG. 1 is a schematic of the architecture of the communication system according to the present invention.

An arrangement of this type is seen in FIG. 1 where the system is indicated by 10. Each household which is serviced contains a broadband telephony interface (BTI) box 12-22. As indicated at box 12, the household is supplied with one video port, one data port and four phone ports. However, other numbers of connections could be provided instead. Each of these BTI boxes is connected to a coaxial cable 24-30. Each of these cables is run through a neighborhood in a traditional fashion, either from utility poles or underground. The BTI box for a household is connected to the corresponding nearest cable by a cable drop.

Although each of cables 24-30 is shown as a single line, in fact, each includes several upstream channels 34 and a downstream channel 32. Each of these coaxial cables is connected to a node such as node 36 which acts to condense the signals on the coaxial cables to three optical fibers 60, 62 and 64. Fiber 60 includes downstream voice data and video signal while the fibers 62 and 64 provide upstream voice and data signals. Other nodes such as 38-42 are similarly connected to various coaxial cables and condense these signals to three optical fibers 60-64 in a similar fashion.

Although coaxial cables 24 and 30 are shown as extending in parallel directions, in fact, they diverge in different directions to pass through various different neighborhoods as needed. As the cable passes each house on a street, a potential customer could be serviced therefrom merely by connecting a cable drop. However, it is realized that not every household passed (HHP) will desire this service; and accordingly, based on experience and economic data, it is possible to estimate the number of subscribers by applying a fraction to the HHP. Thus, this indicates the estimate of the number of subscribers which will be serviced by that cable or node. While the coaxial cables and fiber optic cables are capable of handling large amounts of traffic, nevertheless, there is a finite amount of communication which can be handled thereby. Accordingly, there are limits on the traffic-carrying capabilities of the lines and nodes. Different numbers of customers may be assumed to sign up for telephony and data subscribers. Furthermore a typical subscriber is assumed to generate voice and data traffic loads in the busy hour and the total traffic-carrying capability of a channel carrying voice and data traffic is determined by an assumed grade of service. The actual number of subscribers and their measured generated traffic loads can also be used to generate an efficient assignment of nodes to CMTS cards.

Each of the nodes is shown as having four coaxial cables connected thereto. However, the actual number of cables can be varied. Likewise, three fiber optic cables are provided on the upstream side of each node. This number can also be varied.

The signals from the nodes are connected to a cable modem termination system (CMTS) card. Each card 44 includes one port 43 for handling downstream signals. This port is connected to line 60 of each node that carries downstream voice data and video signals. The video signal is provided from the video head 46 directly to port 43. The voice and data signals are provided through the CMTS card as will be described later.

Ports 45 are connected to nodes 36-42 by way of upstream links 62 and 64. The number of upstream ports 45 can vary. The card shown is a 1×6 card. Other common cards are 1×4 and 1×8. The ports 45 are connected to various combinations of lines 62 and 64. Thus, it is possible that one port may be connected to an individual line 62 or 64. It is also possible that a port will be connected to both ports from a single node. It is also possible for a port to be connected to one line from one node and another line from another node. Lastly, it is possible that both lines from a single node will be connected jointly to two ports. Thus, individual upstream channels on cables 34 get associated with channel ports 45 and downstream channel port 43 gets associated with the downstream channel on cable 32.

The card is connected through a router 49 to an Internet network 50 so that data in an Internet protocol may be sent and received thereto. Voice signals are routed to an IP data terminal 48, which converts voice-over-IP packets to GR.303 circuit format, and are passed to a voice switch circuit, such as a 5ESS network 52.

While all of the components of the system have some limits on their traffic-carrying capability, it has been found that depending on customer typical load generating characteristics, either the downstream channel port 43 or the upstream channel ports 45 are the bottleneck. Accordingly the number of households served by a card should be limited to prevent the system from being overloaded. A typical number of households (HHPs) could be 2500, although other numbers may be appropriate for different kinds of CMTS cards and depending on customer load generating characteristics in the Busy Hour.

Figure 2:
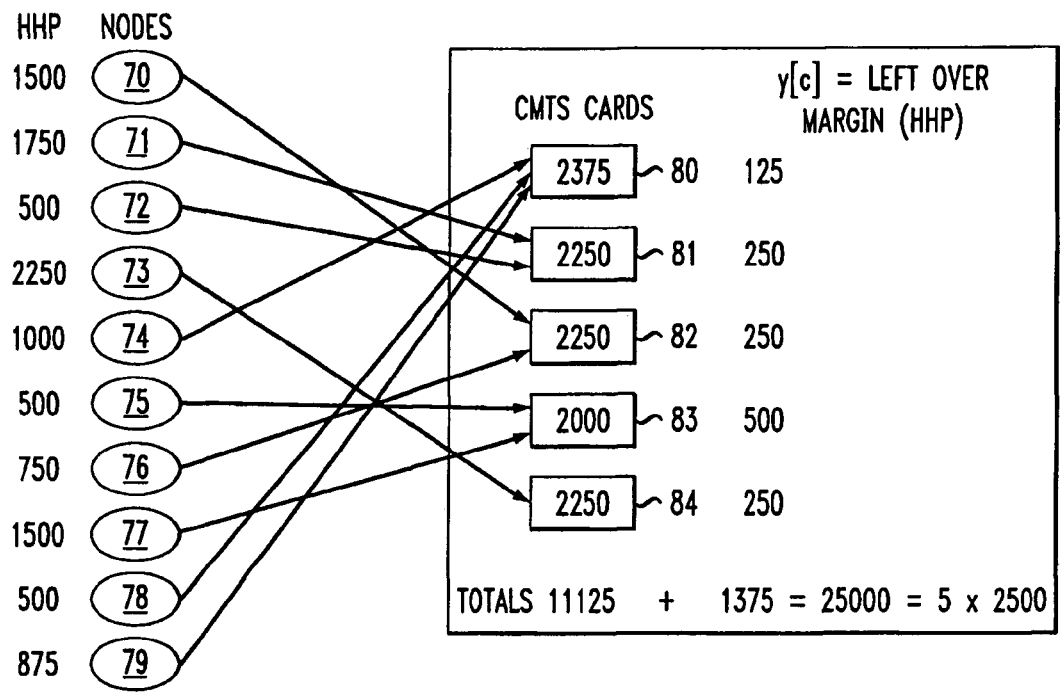
FIG. 2 is a diagram showing an example of the assignment of ten nodes to five CMTS cards according to the present invention.

FIG. 2 is a diagram showing an example of a typical situation. Ten nodes 70-79, having various numbers of households connected thereto, are connected to five CMTS cards 80-84. Assuming the maximum number of households which can be carried by a card is 2500, it is desirable to connect the nodes to the cards in such a way that the total number of households served by a card is approximately equal to other households and slightly less than the maximum number of households which could be carried by a card. Thus, as seen in FIG. 2, card 80 is connected to nodes 74, 78 and 79 which have a combined number of households of 2375. Similarly, card 81 is connected to nodes 71 and 72 to have a total number of households of 2250. Similarly, card 82 is connected to nodes 70 and 76 for a total number of households of 2250 while card 83 is connected to nodes 75 and 77 for a total of number of households of 2000. Finally, node 84 is connected only to node 73 which has a total number of households of 2250 by itself. As seen in the figure, the cards have a margin of 125, 250, 250, 500 and 250, HHP respectively. This assignment allows for growth and provides protection for errored forecasts by maximizing the minimum of all card margins.

Figure 3:
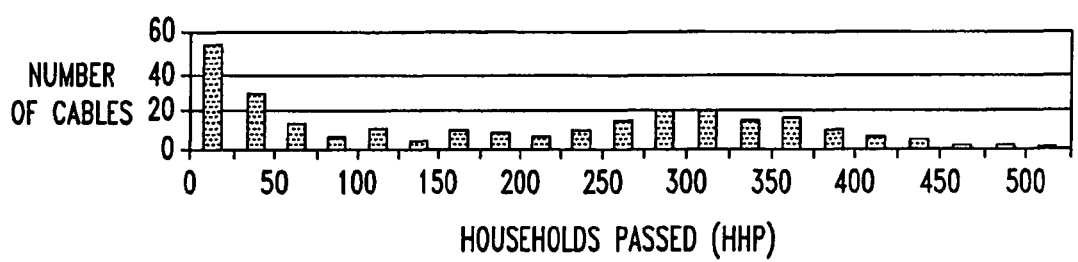
FIGS. 3-6 are graphs showing an example of distribution of households connected to various parts of the architecture of the present invention.

FIGS. 3 through 6 describe a real-life study concerning the distribution of nodes to CMTS cards in Boulder, Colo. These bar graphs describe the distribution of households (HHP) assigned to the various parts of the system. In FIG. 3, the number of households is plotted against the number of cables. In the study, there are a total of 284 cables and 48,212 households. FIG. 3 shows that while there are a number of cables that have a very small number of households connected, there is then a curve extending from about 150 to about 450 households with a peak around 300 households.

Figure 4:
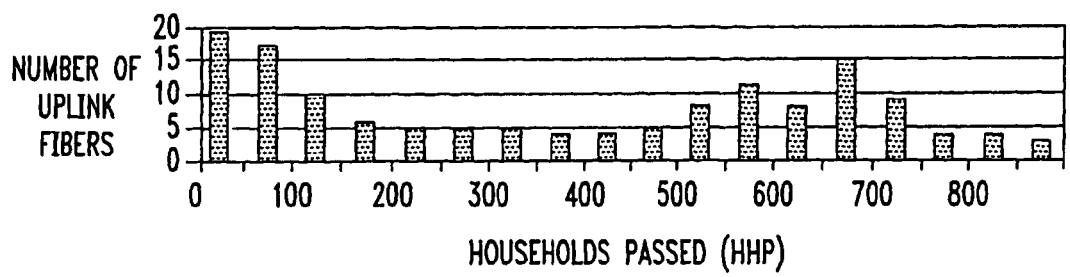

FIG. 4 plots the distribution of the households compared to the upstream voice and data lines 62, 64. Since, in our example, the nodes have four incoming cables and two outgoing upstream lines, there are half as many lines as cables. Accordingly, the number of households per unit is increased. In this curve there are still a large number of lines with a small number of households but then a curve extending from about 400 to 800 with a peak close to 700 is also seen.

Figure 5:
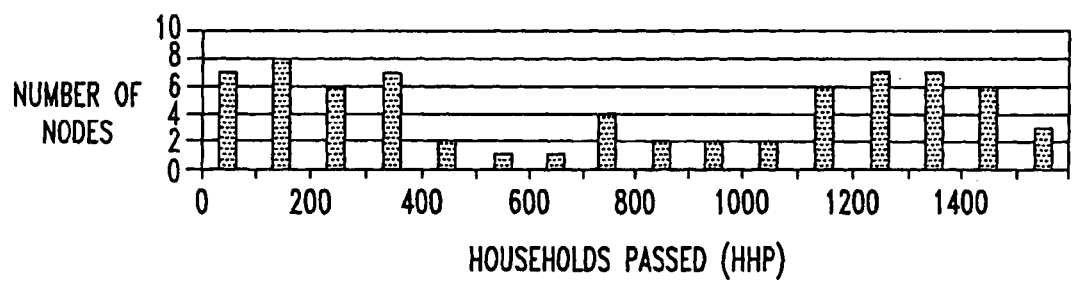
Figure 6:
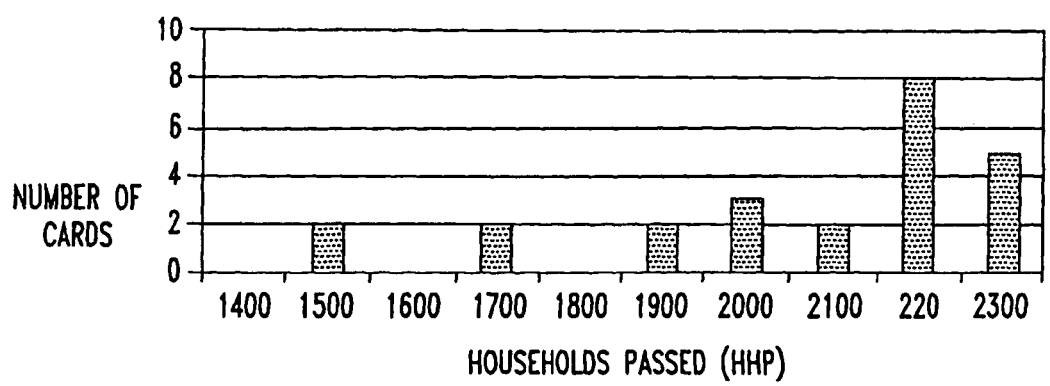

In FIG. 5, the distribution of households is plotted against the number of nodes. The number of total nodes is half that of the number of lines in the previous figure, namely 71. Again, there are a number of nodes having a small number of households with another curve at the higher end having a peak at about 1300 households. Finally, FIG. 6 compares the distribution of households to the number of cards. There are 24 cards available and the nodes are arranged so that fully one third have 2200 households assigned. And all but four of the cards fall in the range of 1900 to 2300 households. Thus, it is seen that it is possible to spread the distribution and substantially even out the load by carefully assigning the nodes to the cards.

A summary of this information is that 284 cables are combined into 71 nodes and then into 24 cards. The cables vary in the number of assigned households between 0 and 476 with an average of about 170. The nodes have a range of assigned households from 0 to 1484 with an average of 680. The cards have a range of 1448 to 2255 households with an average of 2009. If the maximum number of households which can be carried by a card is 2556, the excess capacity of the cards range from 301 to 1108 with an average 547. Since the cards are extremely expensive and since the bottleneck in the traffic flow is in the incoming upstream signals of the card, properly distributing the nodes to the various cards makes the operation more even and increases the traffic flow by avoiding the overload of any one card. As can also be seen from the data above, this assignment of nodes narrows the range of values so that the best use is made of all cards.

While a simple example can be solved manually in such a system, it is necessary to describe the general situation in mathematical terms so that a solution can be quickly and easily obtained for any situation using linear, integer and binary programming techniques. Once the model has been described mathematically, it is possible to provide a computer solution using a linear programming program such as AMPL or CPLEX. These programs are known in themselves (see U.S. Pat. No. 6,333,979, column 14 starting at line 64). However, it is necessary to first model the problem in mathematical terminology.

The problem may be described as follows. Each node can be characterized by the number of households assigned to it by $H[i]$. Of course, this number is the sum of the number of households assigned to each of the four cables connected to the node. The nodes must be assigned to the CMTS cards in such a way that each card has assigned thereto no more than a maximum number of nodes, SMAX. This can be, for example, four nodes. At the same time, a card should be assigned no more than the maximum number of households HMAX. In the example, this would be a maximum of 2556 households. For each feasible assignment of nodes to cards, the margins, or unused capacity, of households is calculated. The assignment which would maximize the smallest margin values is sought.

In order to solve this problem, it is first necessary to estimate the number of CTMS cards by rounding up to the nearest integer the expression $\Sigma H[i]/HMAX$. Assuming that there are four cards per CMTS, using engineering judgment, the number of available-cards c can be determined. This number may need to be incremented repeatedly by 1 until a feasible solution of distribution of nodes is determined.

Two variables are utilized in the formulation of the program. One variable, $x[i,c]$, is an assignment variable which equals 1 when a specific node "i" is assigned to card "c." It equals 0 otherwise. A second variable is $y[c] \geq 0$, indicating the leftover capacity for households or margin present in card c. A third variable w indicates a weight which equals 1 when the search reaches an optimal solution and remains 0 when it is searching for a feasible solution.

The constraints for this problem include several formulas:

$\Sigma x[i,c]=1$; for all "i"—every node must be assigned to some card.

$\Sigma x[i,c] \leq SMAX$; for all "c"—a card can serve at most SMAX nodes.

$\Sigma x[i,c]*H[i]+y[c]=HMAX$; for all "c"—a card can serve at most HMAX households.

$y[c] \geq z$; for all "c"—all cards must have at least a margin or unused capacity of z households.

$z \geq YMAX$—the minimum margin must be at least YMAX.

The objective of the program is to maximize $w*z$.

The model described above could be implemented using the linear programming techniques described above as AMPL and CPLEX. For relatively small problems, where there are ten cards and by setting the weight to 1, it is possible to obtain an optimal solution that maximizes the minimum margin across all cards very quickly. For larger problems such as 71 cards, it has been found that optimal solutions are difficult to find. However, if the weight is set to 0, a feasible solution can quickly be found. Accordingly, it has been found that the formulation of the problem using the above model allows a solution to be found for the assignment of nodes to cards. For even larger problems, one could relax the binary constraint and replace it with $0<=x[i,c]<=1$. A heuristic integerization may be needed if $x[i,c]$ comes out to be fractional in the solution.

It is also possible to add additional constraints to the model, such as indicating that certain nodes must be served by the same card or certain nodes cannot be served by the same card.

FIG. 7 is a flowchart describing the steps necessary in order to determine the proper assignment of nodes to individual cards. Starting at step 90, it is first necessary to design the arrangement of cables and nodes in the system and to determine the number of households involved, the number of nodes involved and their distribution. This is accomplished in step 92. Next, it is necessary to determine the number of cards that will be needed for this arrangement in step 94. This is partly determined by engineering judgment and partly by the ratio of total number of households to the maximum number of households carried by a card. Next, in step 96, the model is formulated by establishing the variables, constraints and objectives as discussed above. This model is then implemented using linear programming techniques in step 98. An optimal solution, or at least a feasible solution, is then determined and the method ends at step 100.

The determination of the assignment of nodes to the cards was based on the understanding that the bottleneck in the system was due to the amount of traffic on the upstream channel ports 45 entering the cards. These traffic loads are carried by 1.6 or 3.2 MHz channels. These get allocated in the 5-40.2 MHz range where other applications might have a claim. If there is an increase in market penetration, the upstream data traffic may cause the bottleneck to shift to the downstream channel port 43. In this case, it may be necessary to extend the model to optimize the reuse of channel frequencies on separate physical paths.

Numerous additional modifications and variations of the present invention are possible in light of the above teachings. It is therefore to be understood that within the scope of the appended claims, the invention may be practiced otherwise than as specifically described herein.

What is claimed is:

1. A method of connecting a plurality of nodes to a plurality of cards in a communication system, the method comprising:
   providing service to customers through cables connected to said nodes;
   determining using a computer a minimum number of said cards for controlling service connections to said nodes by contemporaneously evaluating the whole communication system for infrastructural arrangement inclusive of all cards and all nodes;
   modeling minimum margins for said cards using an optimization model that includes linear relationships among customer distribution data and a set of constraint conditions for said cards; and
   mathematically solving the model using linear, integer, and binary programming techniques, to determine a solution, whereby the number of customers served by each said card is similar for a simultaneous assignment of all of said nodes to all of said cards, wherein the number of said nodes being assigned to said cards are distributed to allocate traffic as evenly as possible, wherein said optimization model is represented by max [x*z]

where x[i, c] is an assignment variable which equals 1 when a specific said node "i" is assigned to said card "c" or 0 otherwise;

v[c]≧0, indicating the leftover capacity for households or margin present in said card c;

w is a weight of 1 when the search reaches an optimal solution and remains 0 when it is searching for a feasible solution;

Σx[i, c]=1: for all "i" when every said node must be assigned to one of said cards;

Σx[i, c]≦SMAX: for all "c" so that said card can serve at most SMAX said nodes;

Σx[i, c]*H[i]+y[c]=HMAX: for all "c" such that said card can serve at most HMAX households;

y[c]≧z: for all "c" such that all of said cards must have at least a margin or unused capacity of z households; and z≧YMAX such that the minimum margin must be at least YMAX.

2. The method according to claim 1, wherein the number of said cards needed is determined to be at least the total number of customers served divided by the maximum number of customers allowed to be served by a card.

3. The method according to claim 1, wherein said set of constraints includes at least one of:

Every said node must be assigned to at least one of said cards;

one of said cards serves a maximum number of said nodes;

one of said cards serves a maximum number of customers; and all cards have a minimum margin of customers.

4. The method according to claim 1, wherein said service provided to said customers is broadband service including video, data and telephony.

5. The method according to claim 1, wherein said customers are provided with a broadband telephony interface which is connected to one of said nodes by a coaxial cable, one of said nodes being connected to one of said cards by a fiber optic cable.

6. The method according to claim 1, wherein the communication system is a voice-over-IP system providing telephony, data and video services to said customer using a hybrid fiber optic-coaxial cable architecture.

7. The method according to claim 1, wherein said optimization program is supplemented by a heuristic algorithm if x[i, c] comes out to he fractional in the solution.

8. The method according to claim 1, wherein said solution includes finding a connection pattern that maximizes said minimum margin among all said cards.

9. The method according to claim 1, wherein said solution includes finding a connection pattern that maximizes said minimum margin among all said cards instantaneously.

10. The method according to claim 1, wherein additional constraints are added to said model to indicate that certain specific said nodes must be served by certain specific said cards.

11. The method according to claim 1, wherein said solution avoids overload of any one card and increases the flow of traffic.

12. A communication apparatus comprising:

a plurality of interface boxes for providing a plurality of respective customers with service from at least one service provider;

a plurality of coaxial cables connected to said boxes;

a plurality of nodes connected to said coaxial cables;

a plurality of fiber optic cables connected to said nodes; and a plurality of cards connected to said fiber optic cables, all of said nodes being assigned to all of said cards in an all-inclusive contemporaneous evaluation so as to allocate traffic as evenly as possible among said cards;

a comprehensive model created by simultaneously evaluating the minimum margins for all said cards using the linear relationships among customer distribution data and a set of constraint conditions for said cards;

a model solving optimization program for mathematically solving the model using linear, integer, and binary programming techniques, to determine an infrastructural assignment arrangement of all said cards and all said nodes, wherein the number of said nodes being assigned to said cards are distributed to allocate traffic as evenly as possible, wherein said optimization program is represented by:

max [x*z]

where x[i, c] is an assignment variable which equals 1 when a specific said node "i" is assigned to said card "c" or 0 otherwise;

y[c]≧0, indicating the leftover capacity for households or margin present in said card c;

w is a weight of 1 when the search reaches an optimal solution and remains 0 when it is searching for a feasible solution;

Σx[i, c]=1: for all "i" when every said node must be assigned to one of said cards;

Σx[i, c]≦SMAX: for all "c" so that each said card can serve at most SMAX said nodes;

Σx[i, c]*H[i]+y[c]=HMAX: for all "c" such that each said card can serve at most HMAX households;

y[c]≧z: for all "c" such that all said cards must have at least a margin or unused capacity of z households; and z≧YMAX such that the minimum margin must be at least YMAX.

13. The communication apparatus according to claim 12, wherein said interface boxes are broadband telephony interface boxes providing connections to telephone, data and video services.

14. The communication apparatus according to claim 12, wherein the assignment of said nodes to said cards is determined by linear relationships having a set of constraints, including at least one of:

that every said node must be assigned to at least one of said cards;

that one of said cards serves at most a maximum number of said nodes;

that one of said cards serves a maximum number of customers; and that one of said cards has a minimum margin of customers.

15. The communication apparatus of claim 12, wherein said optimization program is supplemented by a heuristic algorithm if x[i, c] comes out to be fractional in the solution.

16. The communication apparatus of claim 12, wherein said solution includes finding a connection pattern that maximizes said minimum margin among all said cards.

17. The communication apparatus of claim 12, wherein said solution includes finding a connection pattern that maximizes said minimum margin among all said cards instantaneously.

18. The communication apparatus of claim 12, wherein additional constraints are added to said model to indicate that certain specific said nodes must be served by certain specific said cards.

19. The communication apparatus of claim 12, wherein said solution avoids overload of any one card and increases the flow of traffic.

* * * * *